(12) United States Patent
Kohli et al.

(10) Patent No.: US 12,045,280 B2
(45) Date of Patent: Jul. 23, 2024

(54) METHOD AND SYSTEM FOR FACILITATING KEYWORD-BASED SEARCHING IN IMAGES

(71) Applicant: XLSCOUT XLPAT, LLC, Wilmington, DE (US)

(72) Inventors: Sandeep Singh Kohli, Ambala (IN); Jitin Talwar, Panchkula (IN)

(73) Assignee: XLSCOUT XLPAT LLC, Wilmington, DE (US)

( * ) Notice: Subject to any disclaimer, the term of this patent is extended or adjusted under 35 U.S.C. 154(b) by 0 days.

(21) Appl. No.: 17/861,144

(22) Filed: Jul. 8, 2022

(65) Prior Publication Data

US 2023/0169111 A1 Jun. 1, 2023

Related U.S. Application Data

(63) Continuation of application No. 15/857,614, filed on Dec. 28, 2017, now Pat. No. 11,386,146.

(30) Foreign Application Priority Data

Jan. 17, 2017 (IN) .............................. 201711001887

(51) Int. Cl.
- *G06F 7/00* (2006.01)
- *G06F 16/532* (2019.01)
- *G06F 16/58* (2019.01)
- *G06F 40/58* (2020.01)
- *G06V 10/24* (2022.01)
- *G06V 30/416* (2022.01)

(52) U.S. Cl.
CPC ........ *G06F 16/5866* (2019.01); *G06F 16/532* (2019.01); *G06F 40/58* (2020.01); *G06V 10/242* (2022.01); *G06V 30/416* (2022.01)

(58) Field of Classification Search
CPC .... G06F 16/5866; G06F 16/532; G06F 40/58; G06V 30/416; G06V 10/242
USPC .................................................. 707/600–899
See application file for complete search history.

(56) References Cited

U.S. PATENT DOCUMENTS

2013/0311502 A1   11/2013  Takata
2014/0317097 A1   10/2014  Elias
(Continued)

*Primary Examiner* — Isaac M Woo
(74) *Attorney, Agent, or Firm* — MDIP LLC

(57) ABSTRACT

Technologies are generally described for a system to extract description of reference numerals in images and facilitate keyword-based search in images. In various examples, the system may include one or more databases, a computer readable memory, and one or more processors. The system may be configured to extract one or more reference numerals from an image, and identify and extract corresponding description of the one or more reference numerals from a description document corresponding to the image. The system may be further configured to extract text from the images, and store the images in a database with the extracted data, i.e., text, reference numerals, and corresponding descriptions. The system may be further configured to receive an input query intending to search images related to a search logic of the input query, search a database to identify an image including either of text or a reference numeral having a corresponding description that corresponds to the search logic of the input query, and render the identified image via a display device executing the output interface.

6 Claims, 6 Drawing Sheets

(56) References Cited

U.S. PATENT DOCUMENTS

2017/0091281 A1* 3/2017 Tizhoosh ................ G06N 3/08
2017/0344629 A1 11/2017 Tsai

* cited by examiner

METHOD AND SYSTEM FOR FACILITATING KEYWORD-BASED SEARCHING IN IMAGES

CROSS-REFERENCE TO RELATED APPLICATIONS

The present application claims priority from Indian Provisional Application No. 201711001887 filed Jan. 17, 2017, the disclosure of which is hereby incorporated herein by reference.

FIELD OF THE INVENTION

Embodiments described herein in general, concern methods and systems for facilitating keyword-based searching in images. More particularly, the embodiments concern methods and systems for accurately extracting description of reference numerals in images, storing the extracted description of reference numerals in a database, and facilitating keyword-based searching in images based on the stored extracted description of reference numerals.

BACKGROUND

Unless otherwise indicated herein, the approaches described in this section are not prior art to the claims in this application and are not admitted to be prior art by inclusion in this section.

The big data analysis and review is taking a giant shape in almost all industries whether be computer rooted or mechanical industries. Reviewing lengthy and bulky analysis reports or documents through corresponding images has been a preferred practice in every domain. The reports or documents such as, but not limited to, technical papers, medical autopsy reports, patent documents, analytical reports, thesis, etc. can be reviewed efficiently by effectively reviewing the corresponding images. In cases, where the images include graphical representations, scaled illustrations, drawings, etc. are the most effective ones to help in reviews. However, such images include most of the information in the form of pointers or reference numerals, which need to be referred to in the corresponding detailed text documents. This proves to a cumbersome task and takes out efficiency out of the review time while reviewing documents on a computer system. In some cases, the images include text written into the images in a language foreign to the reviewer, thereby making the images practically illegible or useless.

In furtherance to the above, requirements for platforms that can resolve the purpose of quick search and analysis of documents or analysis reports has been observed. Although, it is a matter of fact that reviewing lengthy and bulky analysis reports or documents through corresponding images has been a preferred practice, yet there has not been any platform that facilitates quick searching in the databases for images comprising a particular drawing figure.

However, there has not been any such platform that facilitate searching certain images directly, via keywords comprising description of information depicted in the images, from a database.

Hence, it is apparent that a need exists for a technique that decimates the problems associated with document reviews including the above mentioned one.

SUMMARY

Technologies described herein relate to methods and systems for extracting description of reference numerals in images.

According to an exemplary embodiment, a computer implemented method to extract description of reference numerals in images, text from images, and facilitate keyword-based searching in images is described. The method comprises retrieving an image from a first database. The method further comprises retrieving a description document, corresponding to the image, from a second database. The method further comprises processing the image to extract a first set of one or more reference numerals. The method further comprises identifying a corresponding description of each reference numeral of the first set of one or more reference numerals from the retrieved description document. The method further comprises extracting the corresponding description of each reference numeral of the first set of one or more reference numerals. The method further comprises displaying each reference numeral of the first set of one or more reference numerals along with the corresponding description of each reference numeral of the first set of one or more reference numerals on a display device.

In some examples, the method further comprises receiving, as an input from a user, a second set of one or more reference numerals. The method further comprises identifying a corresponding description of each reference numeral of the second set of one or more reference numerals from the retrieved description document. The method further comprises extracting the corresponding description of each reference numeral of the second set of one or more reference numerals. The method further comprises displaying each reference numeral of the second set of one or more reference numerals along with the corresponding description of each reference numeral of the second set of one or more reference numerals on the display device.

In some examples, the method further comprises extracting text from the image. The method further comprises storing the image along with data associated with the image in a third database, wherein the data comprises the corresponding description of each of the first and second set of reference numerals and the text extracted from the image.

In some examples, the method further comprises performing the steps of extracting text, first and second set of reference numerals, and corresponding descriptions of each of the first and second set of the reference numerals, and storing the data associated with the image for a plurality of images.

In some examples, the method further comprises receiving an input query from the user, wherein the input query comprises one or more keywords. The method further comprises searching the third database to identify at least one image of the plurality of images, wherein the at least one image includes text or at least one reference numeral having a corresponding description that corresponds to the one or more keywords of the received input query. The method further comprises rendering the identified at least one image to the user via the display device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE PREFERRED EMBODIMENT

Figure 1:
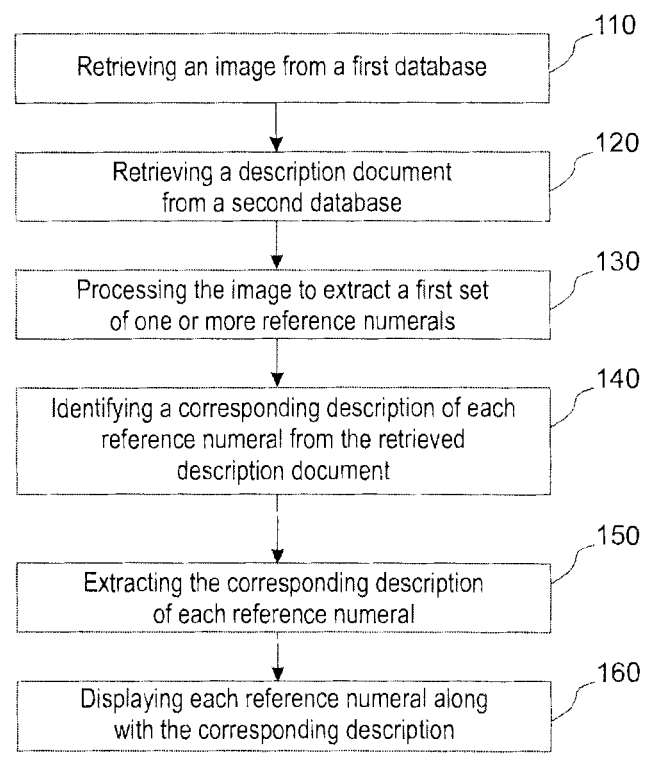
FIG. 1 schematically shows an exemplary flow diagram for a method to extract description of reference numerals in images.

Embodiments of the present invention are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

This disclosure is generally drawn, inter alia, to methods, apparatuses, systems, devices, non-transitory mediums, and computer program products related to accurately extract description of reference numerals in images and subsequently facilitate keyword-based searching in images.

An example of a system may be configured to extract description of reference numerals in images. The system may be configured to retrieve an image, corresponding to a received input query, from a first database. The system may be configured to retrieve a description document, corresponding to the received input query, from a second database. The system may be configured to process the image to extract a first set of one or more reference numerals. The system may be configured to identify a corresponding description of each reference numeral of the first set of one or more reference numerals from the retrieved description document. The system may be configured to extract the corresponding description of each reference numeral of the first set of one or more reference numerals. The system may be configured to display each reference numeral of the first set of one or more reference numerals along with the corresponding description of each reference numeral of the first set of one or more reference numerals on a display device.

In some examples, the system, being configured to process the image to extract one or more reference numerals, may be further configured to identify one or more informative areas and one or more blank areas on the image. In some examples, the system may be further configured to analyse each of the one or more informative areas to determine whether information on the informative area is a reference numeral or not. In some examples, the system may be further configured to extract the reference numeral upon determining that information on the informative area is a reference numeral.

In some examples, the system may be configured to receive, as input from a user, corrections or modifications in the displayed descriptions of the reference numerals.

In some examples, the system, being configured to process the image to extract a first set of one or more reference numerals, may be further configured to filter garbage or noise out of the extracted first set of one or more reference numerals. The system may be further configured to process the image into pixels and determine coordinates of each pixel. The system may be further configured to check the pixels around the coordinates of each reference numeral of the extracted first set of reference numerals and determine whether the pixels around the coordinates of each reference numeral correspond to garbage or noise value. In some example, the garbage or noise value may comprise text such as, but not limited to, figure, fig., drawing, image, or any other similar text describing image details. The system may be further configured to exclude a reference numeral from the first set of the reference numerals upon determining that the coordinates around the coordinates of the particular reference numeral correspond to garbage or noise value.

In some examples, the system, being configured to filter garbage or noise out of the extracted first set of one or more reference numerals, may be further configured to differentiate between a "two-digit reference numeral" and "two closely spaced single digit reference numerals." The system may be further configured to process the image into pixels and determine coordinates of each pixel. The system may be further configured to identify probable two-digit reference numerals from the first set of reference numerals. The system may be further configured to, for each probable two-digit reference numeral, analyse co-ordinates around each digit of the probable two-digit reference numeral. If the vertical coordinates of the digits of the probable two-digit reference numeral are not exactly same, the system may be configured to determine the reference numeral to be "two closely spaced single digit reference numerals" rather than a "two-digit reference numeral." If the vertical coordinates of the digits of the probable two-digit reference numeral are exactly same, the system may be further configured to analyse the horizontal coordinates of the two digits to determine a distance between the two digits. If the determined distance is greater than a threshold, the system may be configured to determine the reference numeral to be "two closely spaced single digit reference numerals" rather than a "two-digit reference numeral." If the determined distance is less than or equal to the threshold, the system may be configured to determine the reference numeral to be a "two-digit reference numeral" rather than "two closely spaced single digit reference numerals."

In some examples, the system, being configured to process the image to extract a first set of one or more reference numerals, may be further configured to rotate the image, in the plane of the image, and extract the reference numerals written in each orientation.

In some examples, the system, being configured to process the image to extract a first set of one or more reference numerals, may be further configured to identify a sequence of the extracted reference numerals from an image. The system may be further configured to exclude a reference numeral from a first set of reference numerals upon determining that the reference numeral is not in sequence with other reference numerals extracted from the image.

In some examples, the system may be configured to receive, as an input from a user, a second set of one or more reference numerals. In some examples, the system may be configured to identify a corresponding description of each reference numeral of the second set of one or more reference numerals from the retrieved description document. In some examples, the system may be configured to extract the corresponding description of each reference numeral of the second set of one or more reference numerals. In some examples, the system may be further configured to display each reference numeral of the second set of one or more reference numerals along with the corresponding description of each reference numeral of the second set of one or more reference numerals on the display device.

In some examples, the system may be configured to display multiple images along with the reference numerals in the multiple images and corresponding descriptions.

In some examples, the system may be configured to store the image with the first set and the second set of one or more reference numerals along with the corresponding description of each reference numeral of the first set and the second set of one or more reference numerals appended on the image in a third database.

In some examples, the system may be configured to process the image to extract text written in the image. In some examples, the text includes the information other than the drawing portions and the reference numerals incorporated in the images. In some examples, the text includes the information written in the blocks of the drawings, such as flow diagrams, included in the images. In some examples, the system, being configured to process the image to extract text written in the image, may be further configured to identify one or more informative areas and one or more blank areas on the image. In some examples, the system may be further configured to analyse each of the one or more informative areas to determine whether information on the informative area is text written in the image or not. In some examples, the system may be further configured to extract the text upon determining that information on the informative area is a text.

In some examples, the system, being configured to extract text written in the image, may be further configured to identify reference numerals, if any, associated with the text. The system may be further configured to identify and extract a corresponding description (from the description document) of the identified reference numeral. If the extracted corresponding description of the identified reference numeral does not match with the text extracted from the image, the system may be configured to replace the extracted text with the extracted corresponding description, thereby improving the accuracy of the text extraction.

In some examples, the system, being configured to process the image to extract text written in the image, may be further configured to rotate the image, in the plane of the image, and extract the text written in each orientation.

In some examples, the system may be configured to store the image with the text extracted from the image along with the first set and the second set of one or more reference numerals along with the corresponding description of each reference numeral of the first set and the second set of one or more reference numerals appended on the image in the third database.

In some examples, the system, being configured to process the image to extract the corresponding description of the reference numerals and the text written in the image, may be configured to identify a first language of corresponding description of the reference numerals and the text. The system may be further configured to translate the extracted corresponding description of the reference numerals and the text into at least one second language and subsequently store the image in different versions, each version comprising the image stored along with the corresponding description of the reference numerals and the text in a different language. The system may be configured to display a version of the image based on as specified by an input from the user.

In some examples, the system may be configured to associate an identifier for the any or both of the corresponding description of the reference numerals and the text identified and extracted from the image. The system may be configured to display the corresponding description of the reference numerals and the text translated into the second language anywhere on the display using the corresponding identifier. For example, the text in the first language may occupy much less space than the text when translated into the second language. The text identified and extracted from the images data may be given a reference identifier and the corresponding text translated into the second language can be displayed anywhere on the display using the corresponding reference identifier.

In some examples, the system may be configured to store each translated version of the text extracted from an image, in different languages, in different databases or as different files. The data corresponding to each image, as stored in the different databases or as different files, is associated with each image with the help of an identifier.

In some examples, the system may be configured to perform the above mentioned processes of extraction of reference numerals, corresponding descriptions, and text from the image for a plurality of images. The system may be configured to store the plurality of images along with the data associated with each image in different files with the help of identifiers. In some examples, the data comprises text extracted from the image, all translated versions of the text, all reference numerals extracted from each image and corresponding description of the reference numerals. In some examples, the identifiers comprise pointers to the files containing each type of data associated with each image. In some examples, the data may be stored in way such as, but not limited to, a digital file, a table, a compressed file, etc.

In some examples, the system may be configured to receive an input query from a user of the system. In some examples, the input query includes one or more keywords. The keywords corresponding either to the description of the reference numerals or to the text stored in the database for the plurality of images. In some examples, the keyword may be a vocabulary or contextual meaning of the description of the reference numerals or the text stored in the database. In some examples, the keyword may be related to any of the description of the reference numerals or the text stored in the database in a way so as to be used as a pointer towards the description of the reference numerals or the text stored in the database. In some examples, the input query may a be logical plan formed of more than one keywords and logical operators intended to perform a search in the database.

In some examples, the system may be configured to search the database to identify at least one image of the plurality of images, which at least one image comprises at least one reference numeral or text corresponding to the received input query. In some examples, the system may be configured to identify all the images whose associated data corresponds to the keyword(s) or logical plan contained in the input query. In some examples, the system may be configured to identify the language of the keywords of the received input query and perform the search in the corresponding database or file.

The system may be configured to render the identified at least one image to the user via a display device. In some examples, all the images whose associated data corresponds to the keyword(s) or logical plan contained in the input query are displayed to the user via a display device along with the associated data. In some examples, the display device may include, but not limited to, a monitor device, LCD/LED display, touch panel, any other display device well known to an ordinary skilled in the art.

In the embodiments detailed herein, the images have been described with an exemplary reference to images of patent documents, however, this exemplary reference should not be considered limiting the scope of the disclosure in any sense, and it should be understood to a person of ordinary skill in the art that all other examples of images such as, but not limited to, images, drawings, graphs, illustrations, videos, structures, chemical structures, or the like be considered within the scope of the disclosure. Further, in the embodiments detailed herein, the description document have been described with an exemplary reference to detailed description of patent document, however, this exemplary reference should not be considered limiting the scope of the disclosure in any sense, and it should be understood to a person of ordinary skill in the art that all other examples of description documents such as, but not limited to, review papers, technical papers, e-newspapers, reports, medical analysis, or the like be considered within the scope of the disclosure. In the embodiments detailed herein, by way of example but not limitation, the reference numerals include identifiers referring to various portions of the drawings depicted in an image of the patent document and each reference numeral has a corresponding description in the detailed description of the patent document. In the embodiments detailed herein, by way of example but not limitation, the text includes the information other than the drawing portions and the reference numerals incorporated in the images. In some examples, the text includes the information written in the blocks of the drawings, such as but not limited to flow diagrams, included in the images.

The disclosure strives to revolutionize the concept of document reviewing on the computer systems by improving efficiency of review of corresponding images of the documents. The images including graphical representations, scaled illustrations, drawings, etc. may be processed to extract reference numerals and display the corresponding description of the reference numerals on the image itself to improve the efficiency of review of the images. Further, the images including block diagrams, flow charts, etc. comprising text in a first language may be processed to extract the text, translate the text into different languages, and display the image in different versions, each version comprising the text in a different language to improve the efficiency of review of the images.

Further, the disclosure strives to revolutionize the concept of quick search and analysis of documents or analysis reports in computer rooted domains by providing a platform that facilitates searching certain images directly, via keywords comprising description of information depicted in the images, from a database.

FIG. 1 schematically shows an example flow diagram of a method for a method to extract description of reference numerals in images, arranged in accordance with at least some embodiments described herein. An example method shown generally at 100 includes retrieving an image from a first database (block 110), retrieving a description document from a second database (block 120), processing the image to extract a first set of one or more reference numerals (block 130), identifying a corresponding description of each reference numeral from the retrieved description document (block 140), extracting the corresponding description of each reference numeral (block 150), and displaying each reference numeral along with the corresponding description (block 160).

Figure 5:
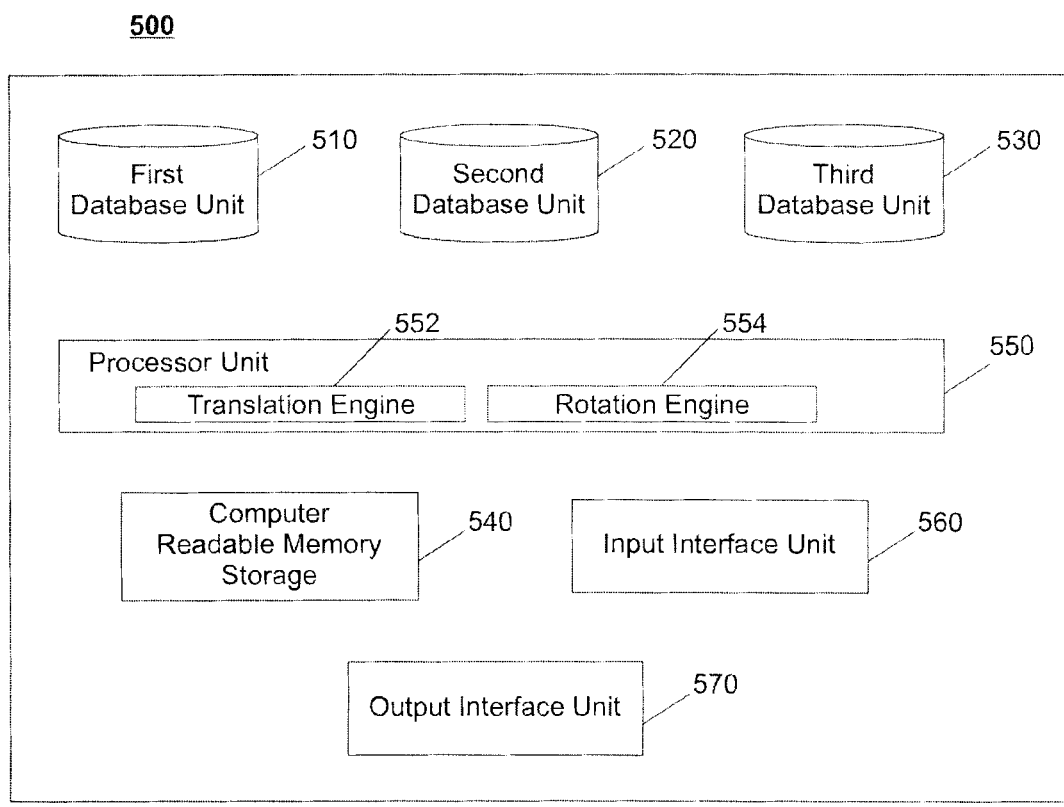
FIG. 5 schematically shows a block diagram of an illustrative example of a system for extracting description of reference numerals in images and facilitating keyword-based searching in images.

Method 100 may be implemented in a system such as the system shown in FIG. 5.

Method 100 may include one or more operations, actions, or functions as illustrated by one or more of blocks 110, 120, 130, 140, 150, and/or 160. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 110, a system (e.g. as one shown in FIG. 5) may be adapted to retrieve an image corresponding to an input query from a first database. By way of example, but not limitation, the image may include picture, pictorial representation, patent image, patent drawing, graph, illustration, video, structure, or chemical structures. By way of example, but not limitation, the input query may be entered by a user of the system.

At block 120, the system (e.g. as one shown in FIG. 5) may be adapted to retrieve a description document corresponding to the input query from a second database. By way of example, but not limitation, the description document may include patent description, specification, review paper, technical paper, e-newspaper, report, or medical analysis, corresponding to the retrieved image. By way of example, but not limitation, file type of the description document may be pdf, word document, excel sheet, html page, etc.

At block 130, the system (e.g. as one shown in FIG. 5) may be adapted to process the image to extract a first set of one or more reference numerals. By way of example, but not limitation, the reference numerals may include numeric, alphabet, alpha-numeric representations referring to some part of the corresponding description. In some examples (not shown in FIG. 1), processing the image to extract the reference numerals may comprise identifying one or more informative areas and one or more blank areas on the image, analysing each of the one or more informative areas to determine whether information on the informative area is a reference numeral or not, and extracting the reference numerals upon determining that information on the informative area is a reference numeral. By way of example, but not limitation, the informative area includes portions or pixels of the image comprising information, i.e., having colour difference with respect to a background of the image. By way of example, but not limitation, the blank area includes portions or pixels of the image not comprising information, i.e., background of the image. In some examples, processing the image to extract the reference numerals may comprise scanning the images using a technique that includes, but is not limited to, optical character recognition, video scanning, formula scanning, or the like.

In some examples (not shown in FIG. 1), processing the image to extract the reference numerals may comprise filtering garbage or noise out of the extracted first set of one or more reference numerals. In some examples, filtering garbage or noise out of the extracted first set of one or more reference numerals may comprise processing the image into pixels and determine coordinates of each pixel. In some examples, filtering garbage or noise out of the extracted first set of one or more reference numerals may comprise checking the pixels around the coordinates of each reference numeral of the extracted first set of reference numerals and determining whether the pixels around the coordinates of each reference numeral correspond to garbage or noise value. In some example, the garbage or noise value may comprise text such as, but not limited to, figure, fig., drawing, image, or any other similar text describing image details. In some examples, filtering garbage or noise out of the extracted first set of one or more reference numerals may comprise excluding a reference numeral from the first set of the reference numerals upon determining that the coordinates around the coordinates of the particular reference numeral correspond to garbage or noise value. For example, numeral '12' in FIG. 2 would not be identified as a reference numeral because of presence of text 'FIG.' (garbage value) in the left co-ordinates of numeral '12.'

In some examples (not shown in FIG. 1), filtering garbage or noise out of the extracted first set of one or more reference numerals may comprise differentiating between a "two-digit reference numeral" and "two closely spaced single digit reference numerals." In some examples, filtering garbage or noise out of the extracted first set of one or more reference numerals may comprise identifying probable two-digit reference numerals from the first set of reference numerals, and for each probable two-digit reference numeral, analysing co-ordinates of and around each digit of the probable two-digit reference numeral. If the vertical coordinates of the digits of the probable two-digit reference numeral are not same, the reference numeral is determined to be "two closely spaced single digit reference numerals" rather than a "two-digit reference numeral." If the vertical coordinates of the digits of the probable two-digit reference numeral are same (with a threshold value of tolerance), the horizontal coordinates of the two digits are analysed to determine a distance between the two digits. If the determined distance is greater than a threshold, the reference numeral is determined to be "two closely spaced single digit reference numerals" rather than a "two-digit reference numeral." If the determined distance is less than or equal to the threshold, the reference numeral is determined to be a "two-digit reference numeral" rather than "two closely spaced single digit reference numerals."

In some examples (not shown in FIG. 1), processing the image to extract a first set of one or more reference numerals, may further comprise rotating the image, in the plane of the image, and extract the reference numerals written in each orientation (explained in further detail with reference to FIG. 2 below).

In some examples (not shown in FIG. 1), processing the image to extract a first set of one or more reference numerals, may further comprise identifying a sequence of the extracted reference numerals from an image. The method 100 may further comprise excluding a reference numeral from a first set of reference numerals upon determining that the reference numeral is not in sequence with other reference numerals extracted from the image.

At block 140, the system (e.g. as one shown in FIG. 5) may be adapted to identify a corresponding description of each extracted reference numeral from the retrieved description document. In some examples (not shown in FIG. 1), identifying a corresponding description of each extracted reference numeral may comprise identifying the recitations of the reference numerals in the description document, and identifying corresponding description referring to the reference numerals. By way of example, but not limitation, the description may be name of an element, depicted in the image, corresponding to the reference numeral, description of an an element, depicted in the image, corresponding to the reference numeral, etc. In some examples (not shown in FIG. 1), identifying a corresponding description of each extracted reference numeral may comprise identifying the corresponding description based on the frequency of occurrence of that particular description for the reference numeral in the description document. For example, if a reference numeral X has two descriptions A and B, and frequency of occurrence of A is more than B in the description document, then the description A is identified as corresponding description of reference numeral X. In some examples (not shown in FIG. 1), identifying a corresponding description of each extracted reference numeral may comprise identifying the corresponding description based on first recitation of the reference numeral in the description document and/or context matching.

At block 150, the system (e.g. as one shown in FIG. 5) may be adapted to extract the corresponding description of each reference numeral of the first set of one or more reference numerals.

At block 160, the system (e.g. as one shown in FIG. 5) may be adapted to display each reference numeral of the first set of one or more reference numerals along with the corresponding description of each reference numeral of the first set of one or more reference numerals on a display device. In some examples, the one or more reference numerals along with the corresponding description may be displayed in tabular format. However, it should be understood to an ordinary skilled in the art that other methods of displaying and illustrating the reference numerals along with the corresponding description are with in the scope of this disclosure. In some examples, the display of the the reference numerals along with the corresponding description may or may not overlay an area on the image. In some examples, a frequency of occurrence of each reference numeral may be displayed along with corresponding description.

In some examples (not shown in FIG.), the method 100 may further comprise receiving, as input from a user, corrections or modifications in the displayed first set of one or more reference numerals and/or corresponding description of the reference numerals.

In some examples (not shown in FIG.), the method 100 may further comprise receiving, as an input from a user, a second set of one or more reference numerals. The method 100 may further comprise identifying a corresponding description of each reference numeral of the second set of one or more reference numerals from the retrieved description document. The method 100 may further comprise extracting the corresponding description of each reference numeral of the second set of one or more reference numerals. The method 100 may further comprise displaying each reference numeral of the second set of one or more reference numerals along with the corresponding description of each reference numeral of the second set of one or more reference numerals on the display device.

In some examples (not shown in FIG. 1), the method 100 may further comprise identifying a first language of the corresponding descriptions of all the reference numerals. The method 100 may further comprise translating the corresponding descriptions of all the reference numerals into at least one second language. The method 100 may further comprise displaying the reference numerals along with the corresponding descriptions in a language chosen by a user input.

In some examples (not shown in FIG. 1), the method 100 may further comprise extracting text written in the image and identifying a first language of the text. The method 100 may further comprise translating the extracted text into at least one second language and subsequently storing the image in different versions, each version comprising the image stored along with the corresponding descriptions of the reference numerals and text in a different language. The method 100 may further comprise displaying a version of the image based on as specified by an input from the user.

In some examples (not shown in FIG. 1) extracting text written in the image may further comprise rotating the image, in the plane of the image, and extracting the text written in each orientation.

In some examples (not shown in FIG. 1), extracting text written in the image may further comprise identifying reference numerals, if any, associated with the text. The method 100 may further comprise identifying and extracting a corresponding description of the identified reference numeral. If the extracted corresponding description of the identified reference numeral does not match with the text extracted from the image, the method 100 may further comprise replacing the extracted text with the extracted corresponding description, thereby improving the accuracy of the text extraction.

In some examples (not shown in FIG. 1), the method 100 may further comprise associating an identifier for the text identified and extracted from the image. The method 100 may further comprise displaying the corresponding text translated into the second language anywhere on the display using the corresponding identifier. For example, the text in the first language may occupy much less space than the text when translated into the second language. The text identified and extracted from the images data may be given a reference identifier and the corresponding text translated into the second language can be displayed anywhere on the display using the corresponding reference identifier.

In some examples (not shown in FIG. 1), the method 100 may further comprise performing the above mentioned steps of extraction of reference numerals, corresponding descriptions, and text from the image for a plurality of images of a plurality of documents. The method 100 may further comprise storing the plurality of images along with the data associated with each image in different files with the help of identifiers in a third database. In some examples, the data comprises text extracted from the image, all translated versions of the text, all reference numerals extracted from each image, corresponding description of the reference numerals, and all translated versions of the corresponding description of the reference numerals. In some examples, the identifiers comprise pointers to the files containing each type of data associated with each image. In some examples, the data may be stored in way such as, but not limited to, a digital file, a table, a compressed file, etc.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figures 2, 12:
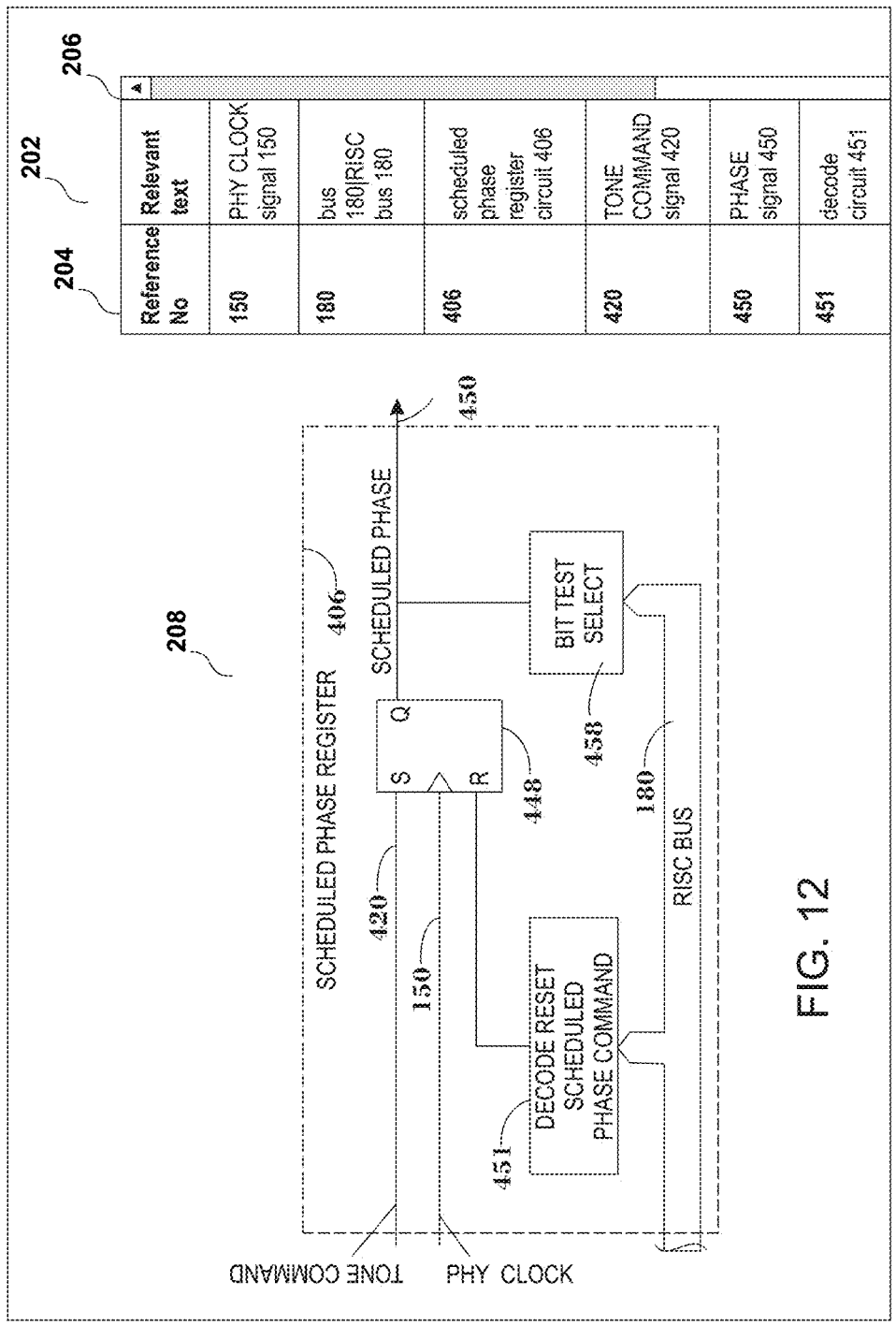
FIG. 2 schematically shows an illustrative example diagram of extraction of description of reference numerals in an image of a patent document.

FIG. 2 schematically shows an example illustrative diagram of extraction of description of reference numerals in an image of a patent document, arranged in accordance with at least some embodiments described herein. An example illustration shown generally at in FIG. 2 includes a screenshot 200 of an interface of a system (e.g. as one shown in FIG. 3) performing the method as described above with reference to FIG. 1. The screenshot 200 generally shows extraction of description of reference numerals "150," "180," "406," "420," "450," "451," of "FIG. 12" of the patent document.

As shown in FIG. 2, the screenshot includes a table 202 depicting reference numerals column 204 showing reference numerals of image 208 and relevant text column 206 comprising description of each reference numeral.

In some examples, FIG. 2 depicts the operation of method 100 as described above, in that, the reference numerals "150," "180," "406," "420," "450," "451," as shown in reference numeral column 204 have been extracted by the system (e.g. as one shown in FIG. 3) from image 208 and corresponding descriptions have been identified and extracted from an associated description document (not shown), such as specification of the patent document, and displayed in table 202 along with corresponding reference numeral.

In some examples, as described above with reference to FIG. 1, the method 100 comprising the steps of filtering garbage or noise out of the extracted first set of one or more reference numerals will be described herein with reference to FIG. 2. For example, the image 208 depicted in FIG. 2 comprises a reference numeral '12.' In some examples, the method 100 comprises processing the image 208 into pixels and determine coordinates of each pixel. The coordinates around the coordinates of reference numeral '12' are checked and it is determined that the coordinates around the coordinates of the particular reference numeral correspond to garbage or noise value, i.e., "FIG." Thus, reference numeral '12' is excluded from the first set of reference numerals whose corresponding description is to be identified and extracted.

Further, the image 208 depicted in FIG. 2 comprises a reference numeral '458.' In some examples, the method 100 comprises processing the image 208 into pixels and determine coordinates of each pixel. The coordinates around each digit of reference numeral '458' are analysed and it is determined that the vertical coordinates of each digit of reference numeral '458' are same. Subsequently, horizontal coordinates around each digit of reference numeral '458' are analysed and it is determined that the distance between each digit of reference numeral '458' is less than a threshold, thereby determining that reference numeral '458' is a three-digit single reference numeral, i.e., '458' and not three separate single digit reference numerals 4, 5, and 8. Further, if the vertical coordinates of each digit of reference numeral '458' are same, it is determined that reference numeral '458' is not a three-digit single reference numeral, i.e., '458' but three separate single digit reference numerals 4, 5, and 8.

Further, the image 208 depicted in FIG. 2 comprises text 'TONE COMMAND' and 'PHY CLOCK,' and a reference numeral '450' written in different orientations from other portions of the image 208. In some examples, the method 100 comprising extracting the reference numerals and text from the image, may further comprise rotating the image 208 in the plane of image 208 and about an axis perpendicular to the plane of the image 208. The method 100 may further comprise extracting the text and reference numerals from the image in each orientation. For example, the text 'TONE COMMAND' in image 208 is extracted when the image 208 is in an orientation 90° rotated clockwise and the text 'PHY CLOCK' and reference numeral '450' in image 208 are extracted when the image 208 is in an orientation 90° rotated anti-clockwise, whereas text 'TONE COM- MAND' and 'PHY CLOCK,' and the reference numeral '450' could not have been extracted using OCR techniques.

One skilled in the art will appreciate that 90° rotated clockwise and 90° rotated anti-clockwise are exemplary and any other orientation be considered within the scope of the disclosure without detracting from the essence of the disclosed embodiments.

Figure 3:
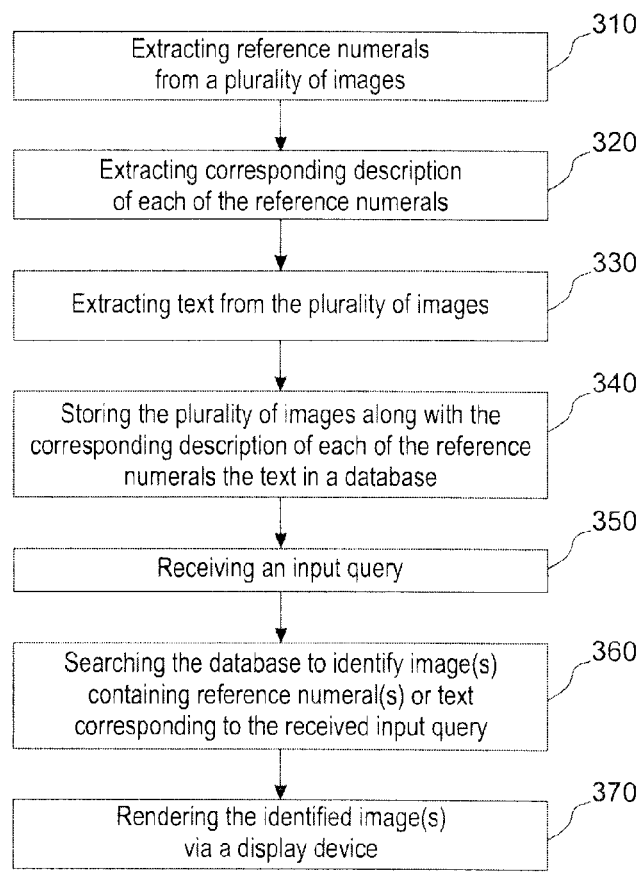
FIG. 3 schematically shows an exemplary flow diagram for a method to facilitate keyword-based searching in images.

FIG. 3 schematically shows an example flow diagram of a method to facilitate keyword-based searching in images, arranged in accordance with at least some embodiments described herein. An example method shown generally at 300 includes extracting reference numerals from a plurality of images (block 310), extracting corresponding description of each of the reference numerals (block 320), extracting text from the plurality of images (block 330), storing the plurality of images along with the corresponding description of each of the reference numerals and the text in a database (block 340), receiving an input query (block 350), searching the database to identify image(s) containing reference numeral(s) or text corresponding to the received input query (block 360), and rendering the identified image(s) via a display device (block 370).

Method 300 may be implemented in a system such as the system shown in FIG. 5.

Method 300 may include one or more operations, actions, or functions as illustrated by one or more of blocks 310, 320, 330, 340, 350, 360 and/or 370. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 310, a system (e.g. as one shown in FIG. 5) may be adapted to extract reference numerals from each of a plurality of images as described above with reference to at least one step of FIG. 1.

At block 320, the system (e.g. as one shown in FIG. 5) may be adapted to extract the corresponding description of each of the reference numerals from corresponding description documents associated with each of the plurality of images as described above with reference to at least one step of method 100.

At block 330, the system (e.g. as one shown in FIG. 5) may be adapted to extract text from the plurality of images as described above with reference to at least one step of method 100.

At block 340, the system (e.g. as one shown in FIG. 5) may be adapted to store each of the plurality of images along with data associated with each of the plurality of images in a database as described above with reference to at least one step of method 100.

At block 350, the system (e.g. as one shown in FIG. 5) may be adapted to receive an input query from a user of the system. In some examples, the input query includes one or more keywords. The keywords corresponding either to the description of the reference numerals or to the text stored in the database for the plurality of images. In some examples, the keyword may be a vocabulary or contextual meaning of the description of the reference numerals or the text stored in the database. In some examples, the keyword may be related to any of the description of the reference numerals or the text stored in the database in a way so as to be used as a pointer towards the description of the reference numerals or the text stored in the database. In some examples, the input query may a be logical plan formed of more than one keywords and logical operators intended to perform a search in the database.

At block 360, the system (e.g. as one shown in FIG. 5) may be adapted to search the database to identify at least one image of the plurality of images, which at least one image comprises at least one reference numeral or text corresponding to the received input query. In some examples, the system may be adapted to identify all the images whose associated data corresponds to the keyword(s) or logical plan contained in the input query.

In some examples (not shown in FIG. 3), the method 300 may further comprise identifying the language of the keywords of the received input query and performing the search in the corresponding database or file for the images containing reference numerals and/or text corresponding to the language of the keywords of the input query.

At block 370, the system (e.g. as one shown in FIG. 5) may be adapted to render the identified at least one image to the user via a display device. In some examples, all the images whose associated data corresponds to the keyword(s) or logical plan contained in the input query are displayed to the user via a display device along with the associated data. In some examples, the display device may include, but not limited to, a monitor device, LCD/LED display, touch panel, any other display device well known to an ordinary skilled in the art.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4A:
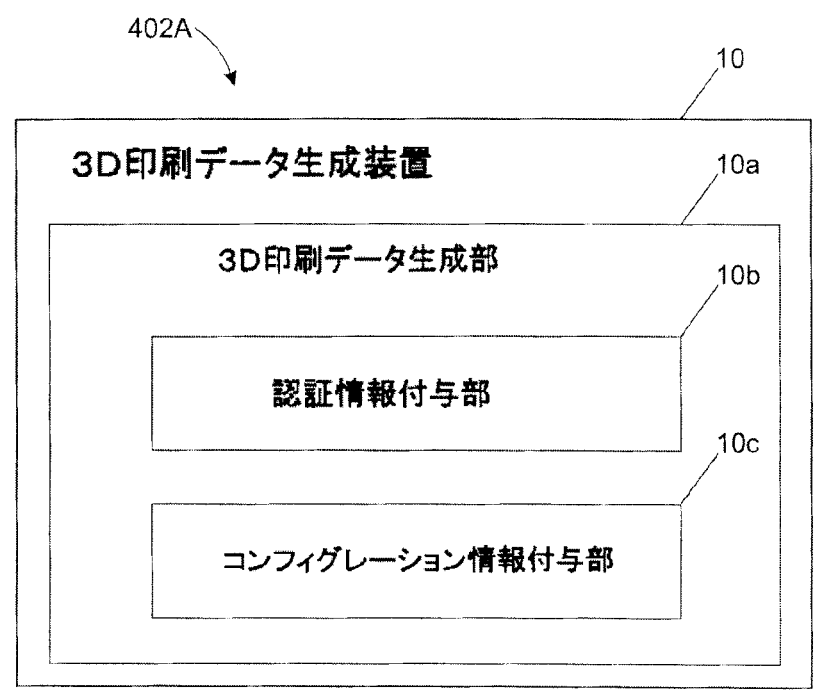
FIG. 4 schematically shows an illustrative example diagram of translation of text extracted from an image.

FIG. 4 schematically shows an illustrative example diagram of translation of text and/or corresponding descriptions of the reference numerals extracted from an image. FIG. 4A depicts an image 402A comprising text blocks 10, 10a, 10b, and 10c. In some examples, the text of the text blocks as well as the reference numerals 10, 10a, 10b, and 10c are extracted from the image according to at least some of the steps of the method 100 as described above. The text from blocks 10, 10a, 10b, and 10c is extracted and a first language of the text, i.e., Japanese is identified. Subsequently, the text is translated into a second language, i.e., English. In some examples, in order to increase the accuracy of the text extraction, the reference numerals 10, 10a, 10b, and 10c are extracted and their respective corresponding descriptions are extracted from a corresponding document describing the image 402A. In case the text extracted from any of the blocks 10, 10a, 10b, and 10c does not match the corresponding description of the reference numeral 10, 10a, 10b, and 10c, the extracted text is replaced with the corresponding description. In some examples, the second language is received as an input from a user, or is a pre-set language.

In some examples, the image, such as 402A, may also contain reference numerals which are not the reference numerals of the text blocks. The method 100 may, in such cases, comprise extracting such reference numerals and corresponding descriptions, and translating the corresponding descriptions from a first language to a second language.

Figure 4B:
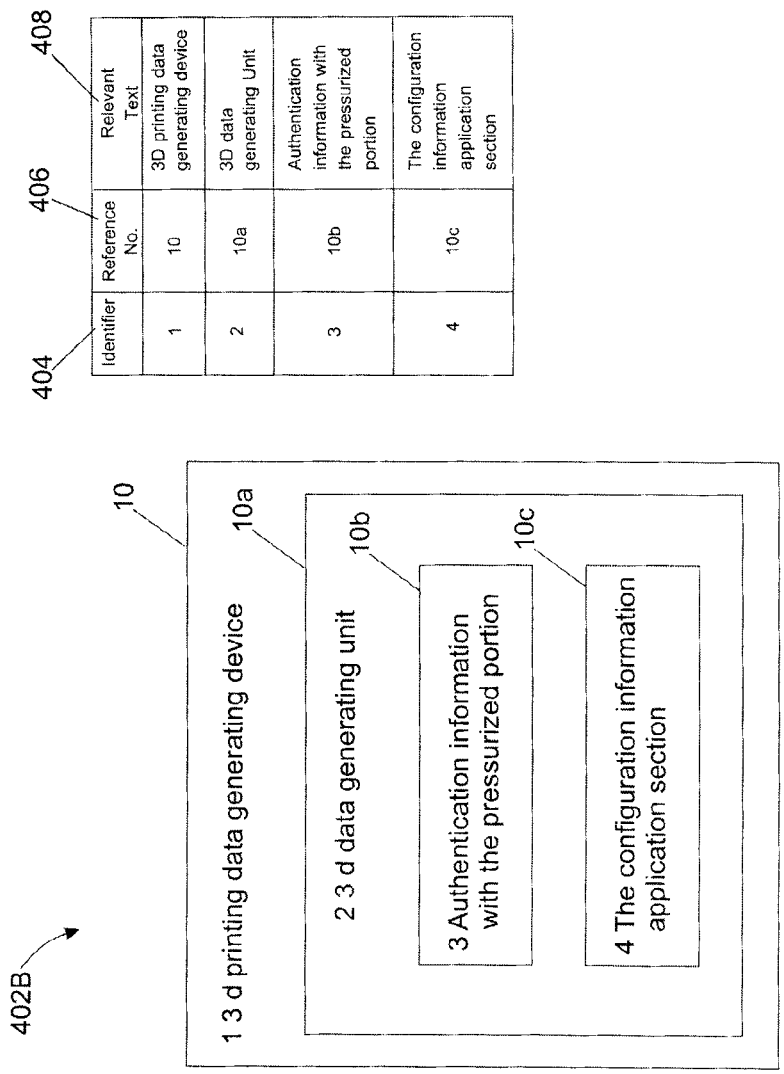

As shown in FIG. 4B, image 402B depicts the text extracted from image 402A displayed in the second language in the place of the text of the image 402A. The identifiers 1, 2, 3, and 4 are associated with the translated text and the text is shown in a table format with the help of identifiers. For example, the column 404 lists the identifiers 1, 2, 3, and 4, the column 406 lists the reference numerals 10, 10*a*, 10*b*, and 10*c*, and the column 408 lists the translated text as depicted in FIG. 4B.

One skilled in the art will appreciate that Japanese and English are exemplary languages and any other language be considered within the scope of the disclosure without detracting from the essence of the disclosed embodiments.

FIG. 5 schematically shows a block diagram of an illustrative example a system 500 for extracting description of reference numerals in an image and facilitating keyword-based search in images, arranged in accordance with at least some embodiments described herein. As depicted in FIG. 5, the system 500 includes a first database unit 510, a second database unit 520, a third database unit 530, a computer readable memory storage 540, a processor unit 550, an input interface unit 560, and an output interface unit 570. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computers and associated components.

In some examples, the first database 510 may be configured to store at least one image and the second database 520 may be configured to store at least one description document associated with the at least one image stored in the first database 510. The third database 530 may be configured to store at least one image along with its text, reference numerals, and corresponding descriptions of the reference numerals. In some examples, the first, second, and third databases 510, 520, and 530 may be implemented as cloud-based databases. In some examples, the first, second, and third databases 510, 520, and 530 may be implemented as single database.

In some examples, the memory unit 540 may be configured to store a set of instructions, which when executed by the processor unit 550, may cause the system 500 to perform the methods 100 and/or 300 as described above.

In some examples, the processor unit 550 may be configured to perform some or all the operations of the methods 100 and/or 300 as detailed above. By way of example, but not limitation, the processor unit 550 may be configured to retrieve an image, retrieve a description document associated with the image, process the image to extract a first set of one or more reference numerals, identify a corresponding description of each reference numeral of the first set of one or more reference numerals from the retrieved description document, receive as input a second set of reference numerals, extract the corresponding description of each reference numeral, display each reference numeral along with the corresponding description of each reference numeral on a display device.

In some examples, the processor unit 550 may be configured to extract text written in the image as described in reference to method 100 and/or 300. In some examples, the processor unit 550 may comprise a translation engine 552 configured to translate the text extracted from the images and corresponding descriptions of the reference numerals extracted from the images into a plurality of languages. In some examples, the processor unit 550 may comprise a rotation engine 554 configured to rotate an image in the plane of the image about an axis perpendicular to the plane. The rotation 554 may be configured to rotate the image to enable the processor unit to extract the text and reference numerals from the image in written each orientation.

In some examples, the processor unit 550 may be configured to extract text and reference numerals and their corresponding descriptions for a plurality of images and store the plurality of images along with the data associated with the images associated to the images with the help of identifiers in database 530. By way of example, but not limitation, the data may be text extracted from the image and all translated versions of the text, reference numerals extracted from the image, corresponding descriptions of the reference numerals and all the translated versions of the corresponding description.

In some examples, the processor unit 550 may be configured to receive an input query comprising one or more keywords, search the database 530 to identify at least one image of the plurality of images, which the at least one image comprises at least one reference numeral or text corresponding to the received input query, and render the identified at least one image to the user via an output interface unit such as, but not limited to, output interface unit 570.

In some examples, the input interface unit 560 may be configured to provide an input interface to a user of the system 500, to provide an input. By way of example, but not limitation, the input may include an input query in the form of a logical plan formed of more than one keywords and logical operators intended to perform a search in the database 530. By way of example, but not limitation, the input interface unit 560 may include a mouse, keyboard, joystick, touchpad, touch screen, voice recognition unit, or any other input unit known to a person having ordinary skill in the art.

In some examples, the output interface unit 570 may be configured to provide an output interface to display or render an output to a user of the system 500. By way of example, but not limitation, the output may include display of identified image from the database 530, and/or image along with extracted corresponding descriptions of the reference numerals. By way of example, but not limitation, the output interface unit 250 may include a display screen, touch screen, audio unit, projector unit, or any other output unit known to a person having ordinary skill in the art.

An exemplary, but not limiting, operation of the present disclosure is detailed herein. The images of a number of patent documents are processed to extract reference numerals from the images. A corresponding description of each of the reference numeral is extracted from the corresponding patent specification. For example, the images of a patent document X are processed to extract reference numerals from the images, and a corresponding description of the reference numerals is extracted from the detailed specification of the patent document X. Similarly, reference numerals and corresponding descriptions are extracted for images of all the patent documents. Further, text written in the images is also extracted. The extracted data (i.e. the extracted text and corresponding description of all the reference numerals) is stored in a database. For example, each image of each of the patent documents is stored in the database and is tagged with the text extracted from the image and the corresponding description of the reference numerals extracted from the image. An input query, in the form of a logical plan formed of the one or more keywords and logical operators intended to perform a search, for relevant images, in the database. The keywords may be a contextual meaning of the description of the reference numerals or the text. The database is searched to identify images whose data (i.e. the extracted text and corresponding description of all the reference numerals) correspond to the input query. All such identified images are then displayed to the user. For example, a user wants to search for patent documents, at least one of whose images depict a "wheel rim." The user enters an input query made up of keywords including "wheel rim" and/or synonyms of "wheel rim." The database is searched to identify the corresponding images. All the images whose extracted text or corresponding description of whose extracted reference numerals relate to the keywords of the input query, are identified and displayed to the user. Thus, all the images, either containing text "wheel rim" or synonyms thereof, or containing reference numeral whose corresponding description correspond to "wheel rim" or synonyms thereof, are displayed to the user.

It is to be noted herein that various aspects and objects of the present invention described above as methods and processes should be understood to an ordinary skilled in the art as being implemented using a system that includes a computer that has a CPU, display, memory and input devices such as a keyboard and mouse. According to an embodiment, the system is implemented as computer readable and executable instructions stored on a computer readable media for execution by a general or special purpose processor. The system may also include associated hardware and/or software components to carry out the above described method functions. The system is preferably connected to an internet connection to receive and transmit data.

The term "computer-readable media" as used herein refers to any medium that provides or participates in providing instructions to the processor of the computer (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The inventions may be embodied in other specific forms not explicitly described herein. The embodiments described above are to be considered in all respects as illustrative only and not restrictive in any manner. Thus, scope of the invention is indicated by the following claims rather than by the foregoing description.

The invention claimed is:

1. A computer implemented method to extract description of reference numerals in images, text from images, and facilitate keyword-based searching in images, the method comprising:
retrieving an image from a first database;
retrieving a description document from a second database, wherein the description document corresponds to the image;
processing the image to extract information, wherein processing the image to extract the information comprises rotating the image in a plane of the image about an axis perpendicular to the plane of the image thereby changing an orientation of the image and extracting the information written in the image in each orientation of the image;
classifying the extracted information into one or more reference numerals, figure identifiers, and/or text;
transforming the text extracted from the retrieved image; and
displaying the transformed text on a display device;
wherein the step of transforming comprises one of:
a. detecting a first language of the extracted text;
receiving, from a user, an input indicative of a second language; and
translating the extracted text from the first language to the second language; or
b. summarizing the extracted text based on the description document.

2. The method of claim 1, further comprising extracting the corresponding description of each reference numeral of the one or more reference numerals and the figure identifiers, and displaying each reference numeral of the one or more reference numerals and the figure identifiers along with the corresponding description on the display device.

3. The method of claim 2, wherein the step of displaying comprises displaying each of the one or more reference numerals, the figure identifiers, and/or the text, in a split view on an interface of the display device.

4. The method of claim 2, wherein the step of displaying comprises each of the one or more reference numerals, the figure identifiers, and/or the text in a pop-up window.

5. The method of claim 2, further comprising transforming the corresponding description of at least one reference numeral; wherein the step of transforming comprises:
detecting a first language of the description document;
receiving, from a user, an input indicative of a second language; and
translating the corresponding description of the at least one reference numeral of the one or more reference numerals from the first language to the second language.

6. The method of claim 5, wherein the step of displaying further comprises displaying the transformed description of at least one reference numeral of the one or more reference numerals on the display device.

* * * * *